United States Patent [19]

Glassey et al.

[11] Patent Number: 5,279,161
[45] Date of Patent: Jan. 18, 1994

[54] PURGE GAS PRESSURE MONITORING SYSTEM WITH TEMPERATURE COMPENSATION

[75] Inventors: Eugene A. Glassey; Ralph A. Loh, both of San Diego, Calif.

[73] Assignee: Fluid Data Systems, San Diego, Calif.

[21] Appl. No.: 868,546

[22] Filed: Apr. 14, 1992

[51] Int. Cl.$^5$ .................... G01L 9/00; G01L 19/04
[52] U.S. Cl. ........................ 73/708; 73/301; 73/751; 73/729.1; 374/143
[58] Field of Search ............ 73/298, 301, 302, 701, 73/708, 729, 751; 374/143

[56] References Cited

U.S. PATENT DOCUMENTS

| | | | |
|---|---|---|---|
| 3,043,144 | 7/1962 | Glassey | 73/401 |
| 3,407,664 | 10/1968 | Glassey | 73/401 |
| 3,475,959 | 11/1969 | Glassey | 73/296 |
| 4,266,430 | 5/1981 | Glassey | 73/701 |
| 4,277,981 | 7/1981 | Glassey | 73/701 |
| 5,005,408 | 4/1991 | Glassey | 73/301 |
| 5,163,321 | 11/1992 | Perales | 73/151 |
| 5,163,324 | 11/1992 | Stewart | 73/302 |

OTHER PUBLICATIONS

"Purge Gas Weight and Atmosphere Buoyancy Compensation for Purge Bubble Water Gauging Systems", Gene Glassey, Fluid (Data)$^2$ Brochure, 1984.
"You Outdid Yourselves with WaterGate II", Gene Glassey, Fluid (Data)$^2$ Brochure, Feb., 1990.

*Primary Examiner*—Richard E. Chilcot, Jr.
*Assistant Examiner*—Joseph L. Felber
*Attorney, Agent, or Firm*—Brown, Martin, Haller & McClain

[57] ABSTRACT

A temperature compensating device is provided for a purge gas pressure monitoring system in which a piezometer line has an outlet end for submerging in a medium to be monitored and an opposite end for connection to a suitable pressure responsive instrument, with a purge gas supply connected to the line so as to supply purge gas as bubbles from the outlet end of the tube. A temperature detector device runs the length of the piezometer line to produce an output signal proportional to an average of the temperature along the length of the line. This may be a resistance temperature detector in the form of a U-shaped conductive wire with opposite legs of the U wound spirally in opposite directions along the length of the line with the connected end of the U being located at the outlet end of the tube. This provides a variable resistance which varies as a function of the average temperature, and which can be connected to conditioning circuitry for producing a desired temperature dependent output.

8 Claims, 2 Drawing Sheets

PURGE GAS PRESSURE MONITORING SYSTEM WITH TEMPERATURE COMPENSATION

BACKGROUND OF THE INVENTION

The present invention relates generally to pressure monitoring systems of the purge gas type in which purge gas is injected into media to facilitate measurement of media pressure. In such systems, a piezometer tube runs from a pressure measuring instrument into a medium to be monitored, and pressurized gas is passed along the tube to escape as bubbles at the end of the tube submerged in the monitored medium. The pressure of the gas escaping from the tube is a function of the pressure of the medium into which it is bubbled, and this pressure is monitored via a remote instrument such as a pressure transducer or balance beam manometer to provide an indication of variations in the depth, density, or other parameters of the medium. The invention is particularly concerned with a temperature compensating apparatus for a purge gas pressure monitoring system.

Purge gas pressure monitoring systems are used in various applications, including monitoring of water depth in rivers, reservoirs and other large bodies of water (commonly known as hydrologic water stage monitoring), monitoring of fluidized bed pressures, pressure monitoring of gases, liquids, and mixtures of liquids and gases, density monitoring, and so on. One error which typically arises in such systems is a result of temperature variations along the piezometer line.

SUMMARY OF THE INVENTION

It is an object of the present invention to provide a new and improved purge gas pressure monitoring system with temperature compensation.

According to the present invention, a purge gas pressure monitoring system is provided which includes a piezometer line connected to a gas supply for passing gas along the tube to an outlet end, the outlet being submerged in a medium to be monitored, and the piezometer line being connected to a monitoring device for measuring pressure in the line. A temperature detecting device extends along the length of the piezometer line from the outlet end to a location at or as close as possible to the pressure monitoring device in order to detect the average temperature along the length of the line between the outlet and pressure monitoring device. The output of the temperature detecting device is used to correct the output from the pressure monitoring device for variations in temperature from a reference value.

In a preferred embodiment of the invention, a resistance temperature detector comprising a length of conductive wire in the form of an elongated U-shape runs the length of the piezometer line, with the closed end of the U being located near the outlet end of the line and the opposite ends of the wire being located near the system instrumentation. The resistance of the wire will be a direct function of the average temperature along the line. The wire ends are connected in a circuit for producing an error compensating output signal to be added to the output from the pressure monitoring device in order to compensate for errors in that output produced by temperature changes.

This arrangement allows errors as a result of changes in the weight of the purge gas column with temperature change to be compensated for and substantially reduced or eliminated from the output of a purge gas type pressure monitoring system.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
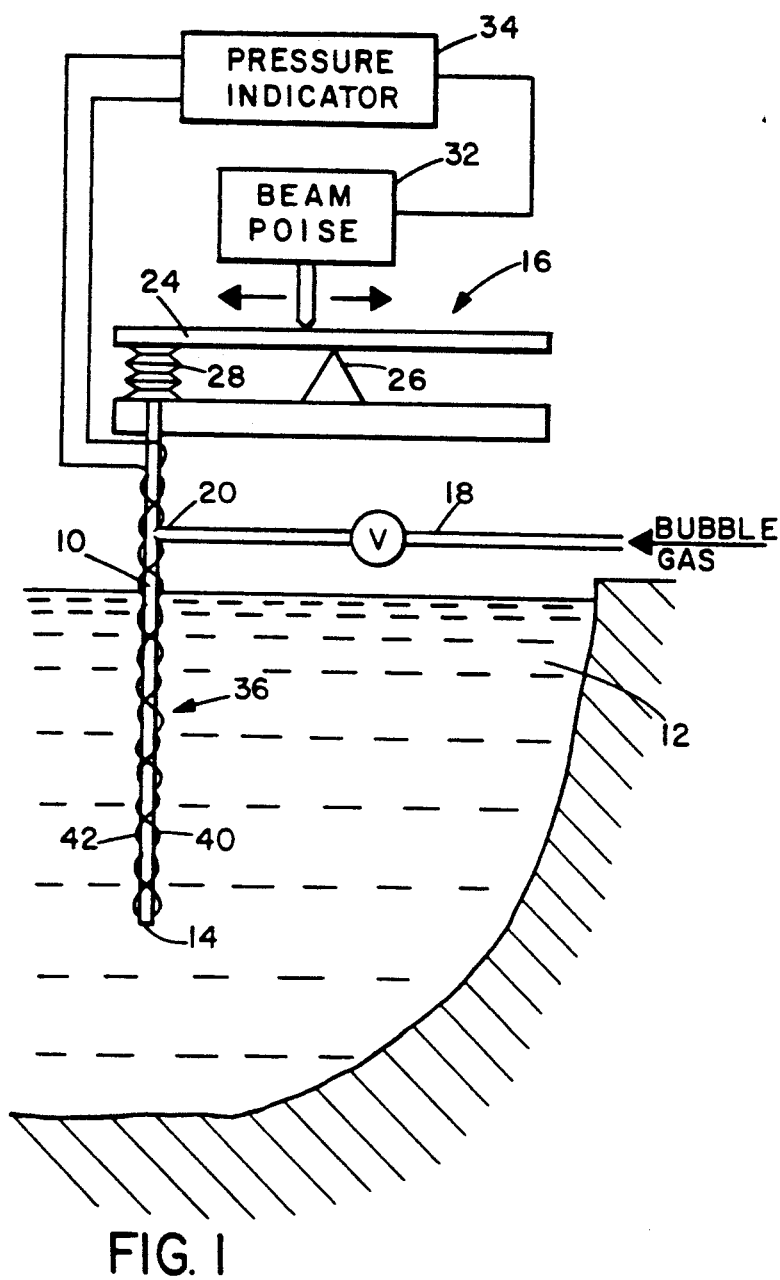
FIG. 1 is a schematic view of a purge gas pressure monitoring system incorporating a temperature compensating device according to a preferred embodiment of the present invention.

FIG. 1 illustrates a purge gas pressure monitoring system in which a piezometer tube or line 10 extends into a body of water 12 to an outlet orifice 14 at a submerged level in the water. It will be understood that such systems are used for monitoring conditions such as pressure, density and depth in media other than water, and the system is illustrated in a water depth monitoring application by way of example only. The line 10 is connected to a pressure monitoring instrument 16 which will generally be in an instrument housing above the water level. In the illustrated embodiment, the instrument 16 is of the balanced beam manometer type, as described in my U.S. Pat. Nos. 4,266,430, 4,277,981 and 5,005,408. However, it will be understood that the piezometer line could alternatively be connected to other types of pressure monitoring instruments such as pressure transducers.

A line 18 runs from a valved source of pressurized gas, such as nitrogen, to a junction 20 at an intermediate point in the length of line 10 so as to supply gas along the line to its outlet orifice 14 where it escapes as bubbles into the fluid being monitored.

In this type of installation, the pressure of gas at the lower outlet 14 of bubbler line 10 from which bubbles escape will be equal to the hydrostatic pressure of the fluid at that level. This in turn will be proportional to the height or level of water at a given temperature, as well as to other parameters such as fluid density. The pressure in the bubbler line at the higher elevation where the measuring instrument 16 is located will be equal to this hydrostatic pressure minus the vertical component of the weight of the gas in the bubbler line and minus a component corresponding to the weight of atmosphere displaced by the liquid in the tank. These components are referred to as "gas weights" errors in my U.S. Pat. No. 5,005,408, and may be compensated for by suitably adjusting the output of the pressure responsive instrument, as described in that patent, the contents of which are incorporated herein by reference.

The pressure responsive instrument 16 in the illustrated embodiment comprises a beam 24 balanced on fulcrum 26, and the pressure from the line 10 is applied via bellows 28 to one end of the beam. Thus, any variation of the pressure in line 10 from a reference value will result in tilting of the beam. A sensor is provided to detect tilting of the beam and to operate servo-motor circuitry to drive the poise 32 in a direction to restore the beam to the balanced position. Rotation of a data shaft to drive the poise along the beam is used to provide an output signal proportional to the applied pressure to pressure indicator circuitry 34. The circuitry 34 preferably includes compensation circuitry for introducing compensation factors into the output to compensate for gas weights, as described in my U.S. Pat. No. 5,005,408 referred to above.

Figure 3:
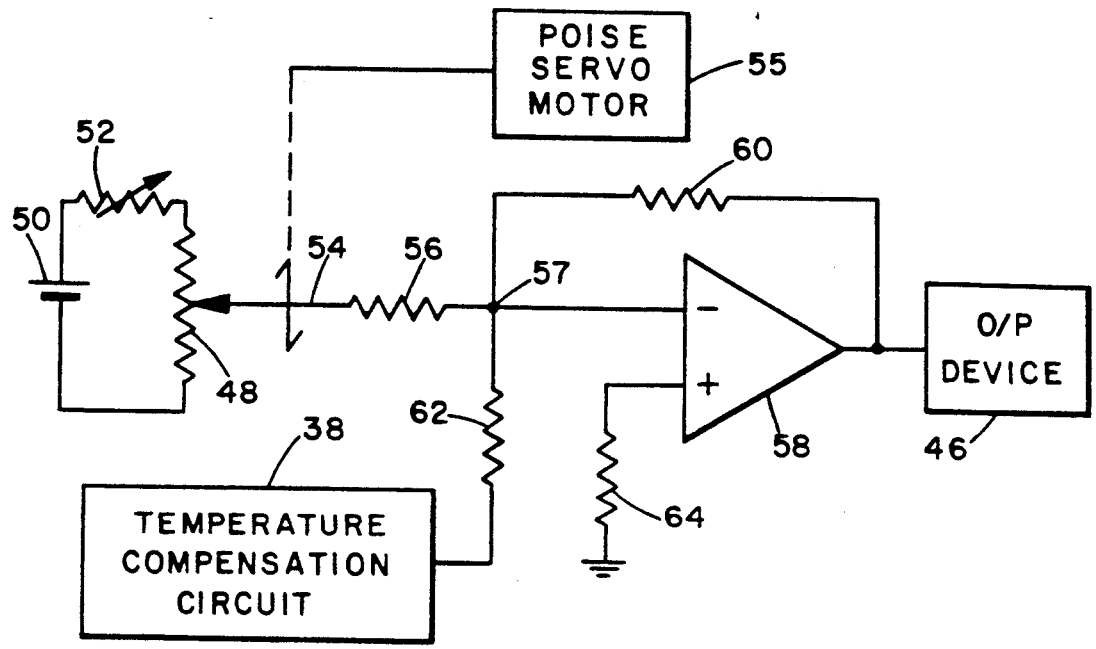
FIG. 3 is a schematic block diagram illustrating the control circuit for adding the temperature compensation signal to the output of the pressure monitoring device.
Figure 4:
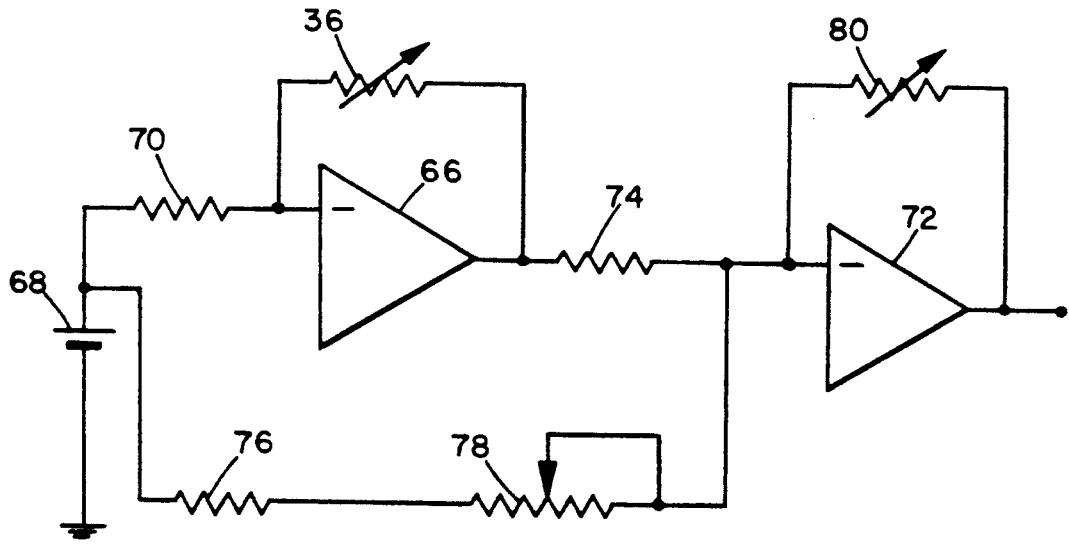
FIG. 4 is a schematic block diagram of the temperature compensation circuit of FIG. 3.

Another error factor inherent in all purge gas or bubbler systems is the change in gas weight as a result of temperature variations. This error can be quite large, particularly in an installation where wide temperature variations are typically encountered, for example a desert located reservoir. In the illustrated system, a temperature compensation device is provided to compensate for such errors. A temperature detector 36 is installed along the entire length of the piezometer line 10 from its outlet 14 to a location in close proximity to the measuring instrument 16, as illustrated in FIG. 1. The output of detector 36 is connected to a temperature compensation circuit 38 as illustrated in FIGS. 3 and 4. The circuit 38 is calibrated to provide the desired output signal for adding a predetermined temperature compensation into the output signal from the system, as will be described in more detail below in connection with FIGS. 3 and 4.

Figure 2:
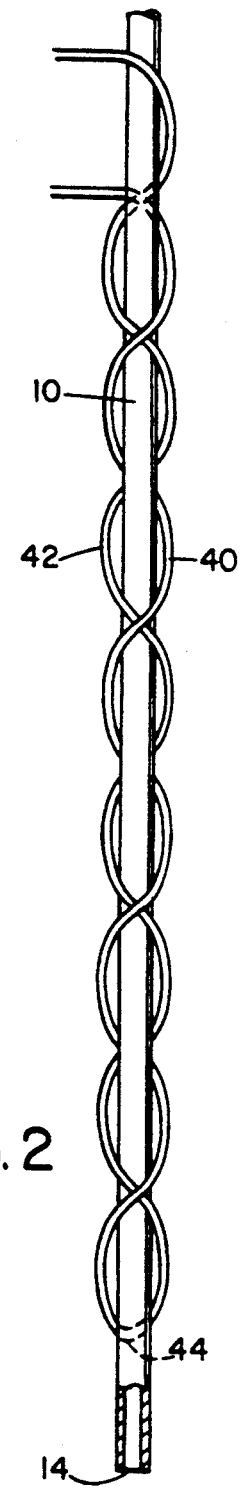
FIG. 2 is an enlarged view of part of the piezometer line illustrating the resistance temperature detector in more detail.

The temperature detector 36 is illustrated in more detail in FIG. 2, and basically comprises a resistance temperature detector in the form of two insulated conductors 40, 42, which may be of nickel or equivalent materials, which are spirally wound in opposite directions along the length of piezometer line 10. The connectors are joined together at 44 near the bottom of line 10 to form an elongated, continuous U-shape running the length of the piezometer line. This acts as a single resistance element having a resistance which varies according to the average temperature along the line both above and below the surface of the monitored medium. The conductors 40 and 42 are wound as evenly as practical along the length of the line in order to produce an average of the temperature along the line.

Terminating leads at the top of the piezometer line in proximity to the system instrumentation are connected to the temperature compensation circuitry 38, which is designed to produce an output voltage in a range from 0 to 2 Volts dependent on the detected temperature, as explained in more detail below.

FIG. 3 schematically illustrates the circuitry for providing the desired output signal to output device 46, which may be an electronic data logger, recorder, transmitter or the like as is known in the field. A potentiometer 48 is connected to power supply 50, and a variable trimming resistor 52 is connected between power supply 50 and the potentiometer 48 in order to vary the potentiometer output voltage at line 54 by a desired gas weights compensation factor, determined as described in my U.S. Pat. No. 5,005,408 referred to above. The data shaft drive by poise servomotor 55 controls the potentiometer resistance, and thus the output voltage, as indicated in FIG. 3.

The output signal from potentiometer 48 is connected through resistor 56 to the output from the temperature compensation circuit 38 at junction 57, with the summed output being connected to differential amplifier 58 having a feedback resistance 60. The output from circuit 38 will be dependent on the detected temperature, and is connected via resistor 62 to the junction 57. The positive input of amplifier 58 is connected to ground via resistor 64.

The temperature compensation circuit 38 is illustrated in more detail in FIG. 4. It is basically a signal conditioning circuit for providing an output signal in the range from 0 to 2 Volts for a temperature range from $-40°$ C. to $+60°$ C., which will be the maximum possible temperature range encountered in practice. The resistance temperature detector 36 is connected as a variable feedback resistance across differential amplifier 66, and a precision reference voltage source 68 is connected to the input of amplifier 66 via resistor 70. The output of amplifier 66 is connected to a second differential amplifier 72 via resistor 74. A variable offset voltage is also applied to the input of amplifier 72 via resistor 76 and variable resistor 78. A variable gain resistor 80 is connected across amplifier 72. The signal conditioning circuitry is set up in a manner which will be understood by those skilled in the field in order to provide the desired 0 to 2 Volts, temperature dependent output from amplifier 72. As illustrated in FIG. 4, this output voltage is used as a variable offset voltage to modify the output from potentiometer 48 as required to provide the desired temperature compensation in the output signal.

Where the purge gas system is used for hydrologic water stage monitoring, the required temperature compensation can be theoretically calculated for a range of different temperatures using the gas weights equations discussed in my U.S. Pat. No. 5,005,408 referred to above, and then used in order to set the resistors 56 and 62 in the circuit in order to provide the necessary compensation factor at each detected temperature. The standard equation for gas weights compensation is as follows:

$$P_g = D_w(H_h - H_r) - D_n \frac{D_w(H_h - H_r) + P_z}{P_o}(H_i - H_r) - D_z(H_h - H_r) \quad (1)$$

In which:

| | UNITS |
|---|---|
| $P_g$ = Pressure of the purge gas analog of depth (Gauge) | Kg/M$^2$ |
| $D_w$ = Density of gauged water, assume unity, (1000 Kg/M$^3$) | 1000 Kg/M$^3$ |
| $H_h$ = Height of water, (For convenience use maximum stage, or maximum possible liquid depth) | Meters above sea level |
| $H_r$ = Height of reference, (Bubbler level), (Choose z = $H_r$) | Meters above sea level |
| $H_i$ = Highest point of bubbler line (Apex, usually in proximity of plumbing Tee to instruments) | Meters above sea level |
| $P_z$ = Local atmospheric pressure at elevation z | From Equation (3), below |
| $P_o$ = Standard atmosphere pressure at sea level, o | 10,322 Kg/M$^2$ |
| $D_z$ = Local density of air at pressure $P_z$ | From Equation (2), below |
| $D_o$ = Standard atmosphere density of sea level, o | 1,226 Kg/M$^3$ |
| $D_n$ = Standard nitrogen density of sea level | 1,250 Kg/M$^3$ |
| o = Sea level elevation reference | Zero |

$$P_g = D_w(H_h - H_r) - D_n \frac{D_w(H_h - H_r) + P_z}{P_o}(H_i - H_r) - D_x(H_h - H_r) \tag{1}$$

In which:

| | UNITS |
|---|---|
| z = Station elevation above sea level | Meters |

In this equation, the second term represents the gas weights compensation and the third term represents the weigh of displaced atmosphere. As noted above, the weight of the gas column will change with temperature variations. This change of weight may be calculated with application of the general gas law, as follows:

$$\frac{v_1}{v_0} = \frac{T_1}{T_0} = \frac{P_0}{P_1}$$

where v represent volume, T represents absolute temperature, and p represents absolute pressure.

By definition, density is weight per unit volume. The volume of the gas column does not change. Thus, substituting the inverse weight for the volume, a simple equation may be written for the described conditions:

$$\frac{T_2}{T_1} = \frac{W_1}{W_2} \tag{2}$$

This may be used in the standard gas weights equation (1) above for a particular installation to work out a corrected gauge pressure over a range of temperatures from $-40°$ to $+60°$. Change in temperature will simply change the second and third terms of the gas weights equation as a function of the ratio of the change in temperature from a selected reference, for example 15° C., the reference temperature for standard atmosphere. Thus, a range of temperature compensation factors for a range of temperatures may be calculated for a particular installation and used in setting the values of the resistors in the circuitry of FIGS. 3 and 4 in order to produce the desired temperature compensated output signal.

In other pressure monitoring applications, the output from the signal conditioning circuitry may be used to produce an output indication of the temperature level, or for otherwise modifying the output pressure signal to introduce an appropriate correction for temperature variations, after appropriate calibration, for example.

This device allows even greater accuracy to be obtained in the output signal from a purge gas pressure monitoring system by compensating for temperature variations along the length of the piezometer line. In practice, temperatures encountered in such purge gas systems will range from very cold to very hot, and this system is set up to cover a temperature range from near absolute zero to red heat of metals. In hydrologic water stage monitoring, which is one area where purge gas pressure monitoring is used, the piezometer line may be exposed to temperature extremes ranging from desert sun to arctic cold in the sections above the water surface, and to the actual water temperature below the water surface. Even greater extremes exist in the many industrial processes where purge gas systems are employed, such as fluidized combustion beds in the steam boilers of power generating plants, and cryogenic tank gauging.

With this system, the output signal from a purge gas system is compensated for such temperature variations and set to a standard reference temperature. This produces a much more accurate output.

Although a preferred embodiment of the invention has been described above by way of example only, it will be understood by those skilled in the field that modifications may be made to the disclosed embodiment without departing from the scope of the invention, which is defined by the appended claims.

We claim:

1. A purge gas pressure monitoring system, comprising:
   a piezometer line having a first, outlet end for submerging in a medium to be monitored and an opposite, second end;
   a gas supply connected to the piezometer line for injecting gas into the medium in the form of bubbles from the outlet end of the piezometer line;
   a pressure responsive instrument connected to the second end of the piezometer line for producing an output signal proportional to the pressure at the second end of the piezometer line;
   a temperature detector device comprising temperature responsive sensing means having a property which varies in response to variations in the temperature of the surrounding medium, the temperature responsive sensing means extending along the length of the piezometer line from the outlet end to a location adjacent the second end; and
   signal conditioning means connected to said temperature detector device for providing a compensation signal to vary said output signal as a function of the average temperature along the piezometer line.

2. The system as claimed in claim 1, wherein said temperature detector device comprises an elongate conductor extending from said second end of the piezometer line along the length of the line to the outlet end and back to the second end of the piezometer line to provide a variable resistance dependent on the surrounding temperature along the line.

3. The system as claimed in claim 2, wherein said conductor comprises two lengths of conductive wire, each wire being spirally wound along the length of the piezometer line, the wires being would in opposite directions and connected together at their ends adjacent said outlet end to form an elongated U-shape, the free ends of the wires comprising terminating leads adjacent the monitoring instrument connected to said signal conditioning means.

4. The system as claimed in claim 3, wherein said wires comprise insulated nickel wire.

5. A piezometer line device for use in a purge gas pressure monitoring system, comprising:
   an elongate tube having a first, outlet end for submerging in a medium to be monitored and a second end for connection to a pressure monitoring instrument;

the tube having connection means intermediate its ends for connection to a purge gas supply; and a temperature detector device comprising a temperature responsive sensor having a property which varies in response to temperature changes in the surrounding medium, the temperature responsive sensor extending along the length of the tube and providing an output signal proportional to the temperature.

6. The device as claimed in claim 5, wherein the temperature detector device is a resistance temperature detector comprising a length of conductive wire in the form of an elongated U-shape having two legs and a connecting portion, the connecting portion of the U-shape being located adjacent the outlet end of the tube and the two legs being spirally wound in opposite directions along the length of the tube to a location adjacent the second end of the tube.

7. The device as claimed in claim 6, including signal conditioning means connected to the free ends of said conductive wire for producing an output voltage which varies according to the resistance of said conductive wire.

8. The device as claimed in claim 6, wherein said wire is insulated nickel wire.

* * * * *

UNITED STATES PATENT AND TRADEMARK OFFICE
CERTIFICATE OF CORRECTION

PATENT NO. : 5,279,161
DATED : January 18, 1994
INVENTOR(S) : EUGENE A. GLASSEY, ET AL.

It is certified that error appears in the above-indentified patent and that said Letters Patent is hereby corrected as shown below:

- Column 6, claim 3, line 55, delete "would" and insert --wound--.

Signed and Sealed this

Twenty-fifth Day of October, 1994

Attest:

BRUCE LEHMAN

*Attesting Officer*    *Commissioner of Patents and Trademarks*